F. W. LOVEJOY.
PHOTOGRAPHIC FILM.
APPLICATION FILED OCT. 27, 1913.
1,213,514.
Patented Jan. 23, 1917.
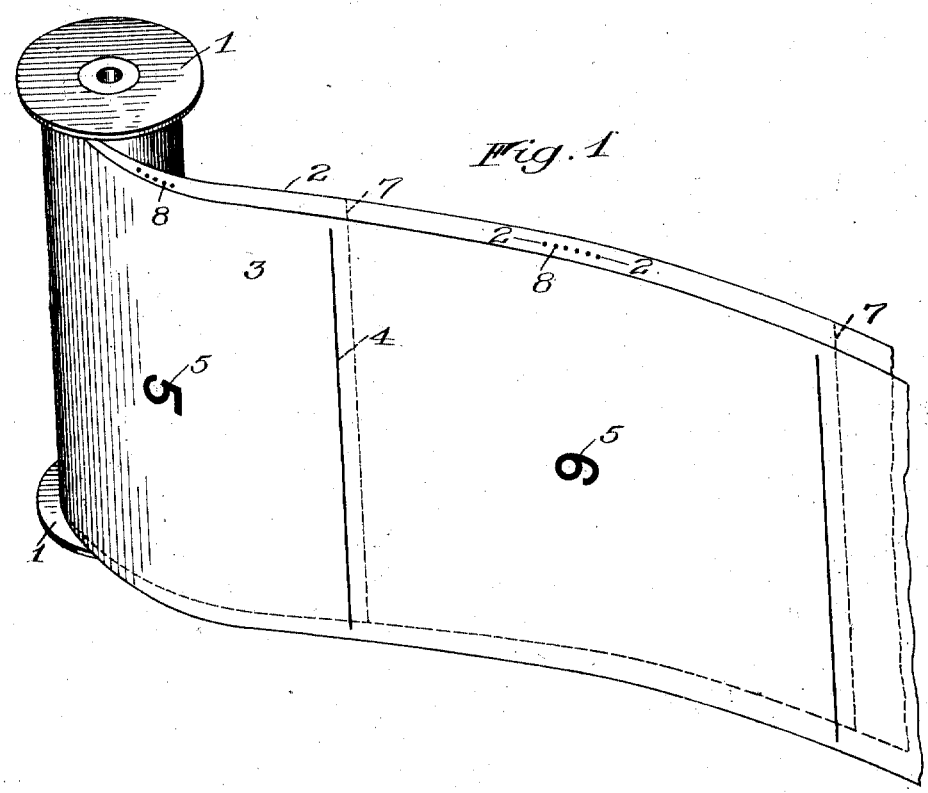
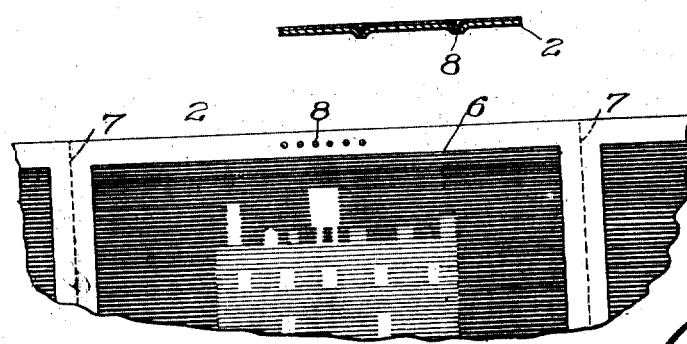
Witnesses
Walter P. Payne
Russell B. Griffith
Inventor
Frank W. Lovejoy
By Church & Rich
his Attorneys

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM.

1,213,514.  Specification of Letters Patent.  Patented Jan. 23, 1917.

Application filed October 27, 1913. Serial No. 797,374.

*To all whom it may concern:*

Be it known that I, FRANK W. LOVEJOY, of Rochester, in the county of Monroe and State of New York, have invented certain new and useful Improvements in Photographic Films; and I do hereby declare the following to be a full, clear, and exact description of the same, reference being had to the accompanying drawings, forming a part of this specification, and to the reference-numerals marked thereon.

My present invention relates to photography and more particularly to the manufacture of photographic films, and it has for its object to provide a film strip comprising a plurality of picture areas adapted to receive a series of successive exposures as in an ordinary film cartridge which strip will be so constituted that any particular picture area or any particular one of a number of successive exposures may be readily identified at any point in the exposure, development or printing of the negatives. It is further sought to provide identifying marks of such a nature and so arranged that they will not restrict the exposure areas in any way and will be adapted to be formed or embodied in the film strip in connection with or without greatly altering or adding to the usual operations of manufacture.

To these and other ends the invention consists in certain improvements and combinations of parts all as will be hereinafter more fully described, the novel features being pointed out in the claim at the end of the specification.

In the drawings: Figure 1 is a perspective view of an exposed film cartridge partly unrolled and embodying a film strip constructed in accordance with and illustrating one embodiment of my invention; Fig. 2 is a fragmentary section taken substantially on the line 2—2 of Fig. 1, and Fig. 3 is a face view of a portion of the strip and of one of the picture areas thereon after development of the negative.

Similar reference numerals throughout the several figures indicate the same parts.

As before indicated, the invention is applicable to the ordinary film cartridge now in use and which comprises generally a spool or reel 1 upon which is wound a continuous strip of sensitized translucent film 2 and a super-imposed coincident strip of black or other non-actinic paper 3 which protects the film from light, moisture and other influences. The backing strip 3 has indicated divisions defined by transverse lines or other marks 4 at intervals and successively numbered as at 5, the said divisions corresponding to coincident picture areas on the film beneath and indicated at 6 in Fig. 3. The numbers 5 on the backing identify the correct positions of the successive areas on the film in the focal plane of the camera during exposure, as is common knowledge, and also the serial position of the exposure with reference to the capacity of the strip or cartridge, while the marks 4 on the backing indicate the points at which the successive exposures or negatives are to be severed to separate them from each other, as indicated by the dotted lines 7. But with the mere structure so far described, there is no means of later identifying a particular picture area or exposure after the backing and strip have been severed and after the backing has been separated from the strip or from the separate negatives into which it has been cut.

In the practice of my present invention, I place upon the film strip 2 itself an inseparable distinguishing mark arranged opposite and individual to each picture area. This mark I place centrally on the narrow edge portion of the strip which does not come within the field of exposure and forms a sort of a border around the negative, being comprised between the picture area 6 and the extreme margin of the strip. Further, I prefer to create the marks by forming up protuberances 8 from the material of the strip itself with a suitable punch or otherwise, as clearly shown in Fig. 2. There is a group of such protuberances in each mark and the numerical constituency of each group indicates the serial position on the strip and hence the order of exposure in the camera of the picture area with which that particular mark is associated. Thus there will be one protuberance in the mark opposite the first picture area; two in the mark opposite the second; three in the mark opposite the third, and so on. In the illustration, the film cartridge shown is of six exposure capacity. The first four exposures having been outermost on the unexposed or charged roll, are innermost on the transfer or exposed roll which is the roll shown and hence exposures 6 and 5 come off first in the order named, as appears in the drawing.

The punch marks are arranged in a line, as shown, and as the dimension of each protuberance is practically negligible, the mark as a whole takes up very little room and yet can be easily and quickly read by the photographer. Also, as they are arranged in a single line, they may be readily formed by a rotary or other punch as the strip is fed along either in connection with some regular operation of its manufacture or as a separate operation. Each picture area, whether in the strip or later as a separate negative, is thus capable of instant identification as to which of the series of exposures it records at all times and independently of the backing strip, the presence of which for this purpose is not required except in the camera during the taking of the pictures.

I claim as my invention:

A continuous strip of photographic film formed in a single integral piece and comprising a plurality of adjoining picture areas adapted to receive a series of successive exposures, one of the longitudinal edges of the film being provided with a plurality of distinguishing marks, one of which is opposite and individual to each picture area and arranged between said area and the margin of the strip, the marks being constituted by protuberances formed up from the material of the film and successive marks consisting of numerically successive groups of protuberances, all arranged in alinement and parallel with the longitudinal edge of the film.

FRANK W. LOVEJOY.

Witnesses:
M. B. LAIDLAW,
M. R. McBRIDE.